United States Patent
Akiyama et al.

(10) Patent No.: US 7,255,944 B2
(45) Date of Patent: Aug. 14, 2007

(54) SEALING STRUCTURE OF FUEL CELL AND MANUFACTURING METHOD OF SAME

(75) Inventors: Shiro Akiyama, Okazaki (JP); Yasuyuki Asai, Toyota (JP); Toshiyuki Suzuki, Toyota (JP); Hiroya Nakaji, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 567 days.

(21) Appl. No.: 10/621,372

(22) Filed: Jul. 18, 2003

(65) Prior Publication Data

US 2004/0023099 A1 Feb. 5, 2004

(30) Foreign Application Priority Data

Jul. 31, 2002 (JP) .............................. 2002-223319
May 15, 2003 (JP) .............................. 2003-136702

(51) Int. Cl.
*H01M 8/00* (2006.01)
*H01M 2/00* (2006.01)
*H01M 2/02* (2006.01)

(52) U.S. Cl. ............................. 429/12; 429/34; 429/35
(58) Field of Classification Search ................. 429/12, 429/34, 35

See application file for complete search history.

(56) References Cited

U.S. PATENT DOCUMENTS 4,590,134 A * 5/1986 Warszawski et al. ......... 429/35
6,533,827 B1 * 3/2003 Cisar et al. ................. 29/623.4
6,635,378 B1 * 10/2003 Yang et al. ................... 429/34
2002/0187384 A1 * 12/2002 Kato et al. ................... 429/35

FOREIGN PATENT DOCUMENTS

| CA | 2 381 397 | 2/2001 |
|----|-----------|--------|
| JP | 2000-048849 A | 2/2000 |
| JP | 2002-367631 A | 12/2002 |

OTHER PUBLICATIONS

Canadian Office Action, Appln. No. 2,436,145 issued Feb. 1, 2007.

* cited by examiner

*Primary Examiner*—Dah-Wei Yuan
(74) *Attorney, Agent, or Firm*—Kenyon & Kenyon LLP

(57) ABSTRACT

A stack structure of a fuel cell according to an aspect of the invention includes a plurality of separators of the fuel cell, and a protruding portion which has a tip portion that contacts a reference portion of an assembly jig during assembly of the fuel cell. Since the tip portion of the protruding portion contacts the reference portion of the assembly jig, an adhesive agent does not come out from the tip portion of the protruding portion. Therefore, it is possible to prevent positioning accuracy in stacking cells from being reduced. The reduction of the positioning accuracy is due to adhesion of the spreading adhesive agent to the reference portion of the assembly jig. In addition, it is possible to prevent a short-circuit from occurring. The occurrence of the short-circuit is due to deformation of the separator caused by making the separator contact the reference portion of the assembly jig.

14 Claims, 8 Drawing Sheets

SEALING STRUCTURE OF FUEL CELL AND MANUFACTURING METHOD OF SAME

INCORPORATION BY REFERENCE

The disclosure of Japanese Patent Applications No. 2002-223319 filed on Jul. 31, 2002 and No. 2003-136702 filed on May 15, 2003 including the specification, drawings and abstract is incorporated herein by reference in its entirety.

BACKGROUND OF THE INVENTION

1. Field of Invention

The invention relates to a stack structure of a fuel cell, and a manufacturing method of same.

2. Description of Related Art

A solid polymer electrolyte membrane fuel cell includes a plurality of Membrane-Electrode Assemblies (i.e., MEAs) and a plurality of separators. Each of the MEAs includes an electrolyte membrane formed of an ion-exchange membrane, an electrode (i.e., an anode, a fuel electrode) formed of a catalyst layer which is provided on one surface of the electrolyte membrane, and an electrode (i.e., a cathode, an air electrode) formed of a catalyst layer which is provided on the other surface of the electrolyte membrane. A diffusion layer is provided between the MEA and the separator on each of the anode side and the cathode side. A fuel gas passage for supplying fuel gas (i.e., hydrogen) to the anode, and an oxidizing gas passage for supplying oxidizing gas (i.e., oxygen, normally, air) to the cathode are formed in the separator. A coolant passage for supplying coolant (i.e., cooling water, normally) is further formed in the separator. A cell is formed by sandwiching the MEA between the separators. A module includes at least one cell. A cell stacked body is formed by stacking a plurality of modules. Terminals, insulators, and end plates are provided at both ends of the cell stacked body in a direction in which cells are stacked (hereinafter, referred to as a "cell stacked direction"). The cell stacked body is fastened in the cell stacked direction. A fastening member (e.g., a tension plate), which is provided outside the cell stacked body and extends in the cell stacked direction, is fixed using screw bolts/nuts. A stack is thus assembled. On the anode side of each cell, a reaction occurs in which hydrogen is decomposed into a hydrogen ion (i.e., a proton) and an electron. The hydrogen ion moves through the electrolyte membrane to the cathode side. On the cathode side of each cell, the following reaction occurs in which water is produced from oxygen, a hydrogen ion and an electron (the electron produced at the anode of the adjacent MEA reaches the cathode side through the separator, or the electron produced at the anode of the cell, which is on one end of the stack in the cell stacked direction, reaches the cathode of the cell, which is on the other end of the stack, through an external circuit). Anode side: $H_2 \rightarrow 2H^+ + 2e^-$ Cathode side: $2H^+ + 2e^- + (\frac{1}{2})O_2 \rightarrow H_2O$. An adhesive agent is provided between the separators which are adjacent to each other with the electrolyte membrane therebetween, and between the separator and the electrolyte membrane, so as to bond the separators, and the separator and the electrolyte membrane, and so as to seal gaps therebetween. A cell is thus formed. A plurality of the cells is positioned and stacked so as to form a stack. Japanese Patent Laid-Open Publication No. 2000-48849 discloses a method for positioning and stacking the cells. In the method, a notched portion is provided at an edge of each separator, and the cells are stacked while making the notched portion contact a guide post which is a reference portion of an assembly jig so as not to cause displacement between the cells.

However, there exist the following problems regarding the conventional method for assembling the cell stacked body. First, the adhesive agent comes out of the gap between the separators to the notched portion when forming a cell, and the adhesive agent, which has come out, adheres to the reference portion of the assembly jig when forming a cell or a stack, which may reduce the positioning accuracy. Secondly, the separator is deformed due to a pressing load when the separator is pressed to the reference portion of the assembly jig, and the anode side separator and the cathode side separator, which are adjacent to each other with the electrolyte membrane therebetween, come into contact with each other, which may cause a short-circuit.

SUMMARY OF THE INVENTION

It is an object of the invention to provide a stack structure of a fuel cell in which positioning accuracy in stacking cells can be prevented from being reduced. The reduction of the positioning accuracy is due to adhesion of a spreading adhesive agent to a reference portion of an assembly jig. It is another object of the invention to provide a stack structure of a fuel cell in which a short-circuit can be prevented from occurring. The occurrence of the short-circuit is due to deformation of the separator caused by making the separator contact the reference portion of the assembly jig.

In order to achieve the above-mentioned objects, a stack structure of a fuel cell according to an aspect of the invention includes a plurality of separators of the fuel cell, and a protruding portion which has a tip portion that contacts a reference portion of an assembly jig during assembly of the fuel cell.

The stack structure of a fuel cell includes a plurality of cells each of which is formed of the separators and an MEA. The protruding portion protrudes in a direction perpendicular to the cell stacked direction. The stack structure further includes sealants, each of which is formed of an adhesive agent, and is provided between the separator and the separator, or between the separator and the MEA when stacking the cells. The protruding portion has a predetermined height such that the sealant does not come out from the tip portion.

In the stack structure of a fuel cell, the protruding portion is provided, and the tip portion thereof contacts the reference portion of the assembly jig. Accordingly, the adhesive agent does not come out from the tip portion of the protruding portion. Also, it is possible to prevent the positioning accuracy in stacking the cells from being reduced. The reduction of the positioning accuracy is due to adhesion of the spreading adhesive agent to the reference portion of the assembly jig.

A stack structure of a fuel cell according to a further aspect of the invention includes a plurality of cells each of which is formed of separators and an MEA, and a protruding portion which is formed on an end portion of each of the separators so as to protrude in the direction perpendicular to the cell stacked direction, and which is formed so as not to overlap with the protruding portion of the adjacent separator in a cell stacked direction. Thus, the protruding portions of the separators adjacent to each other (e.g., the separator on an anode side and the separator on a cathode side, when the separators adjacent to each other are the separator on the anode side and the separator on the cathode side) are displaced from each other in the cell stacked direction. Accordingly, even if the protruding portions are deformed, the protruding portions do not contact with each other, which can prevent a short-circuit from occurring. The occurrence of the short-circuit is due to deformation of the separators caused by making the separators contact the reference portion of the assembly jig.

A manufacturing method of a stack structure of a fuel cell according to a further aspect of the invention includes the steps of preparing a plurality of separators each of which has a protruding portion on an end portion thereof; preparing an assembly jig used during assembly of the fuel cell; and stacking the plurality of separators while making a tip portion of the protruding portion of each of the separators contact a reference portion of an assembly jig.

DETAILED DESCRIPTION OF the PREFERRED EMBODIMENTS

Hereafter, a stack structure of a fuel cell according to the invention will be described with reference to FIGS. 1 to 12. The fuel cell according to the invention is a solid polymer electrolyte membrane fuel cell 100. The fuel cell 100 is mounted, for example, on a fuel-cell vehicle. However, the fuel cell 100 may be employed in products other than an automobile.

Figure 11:
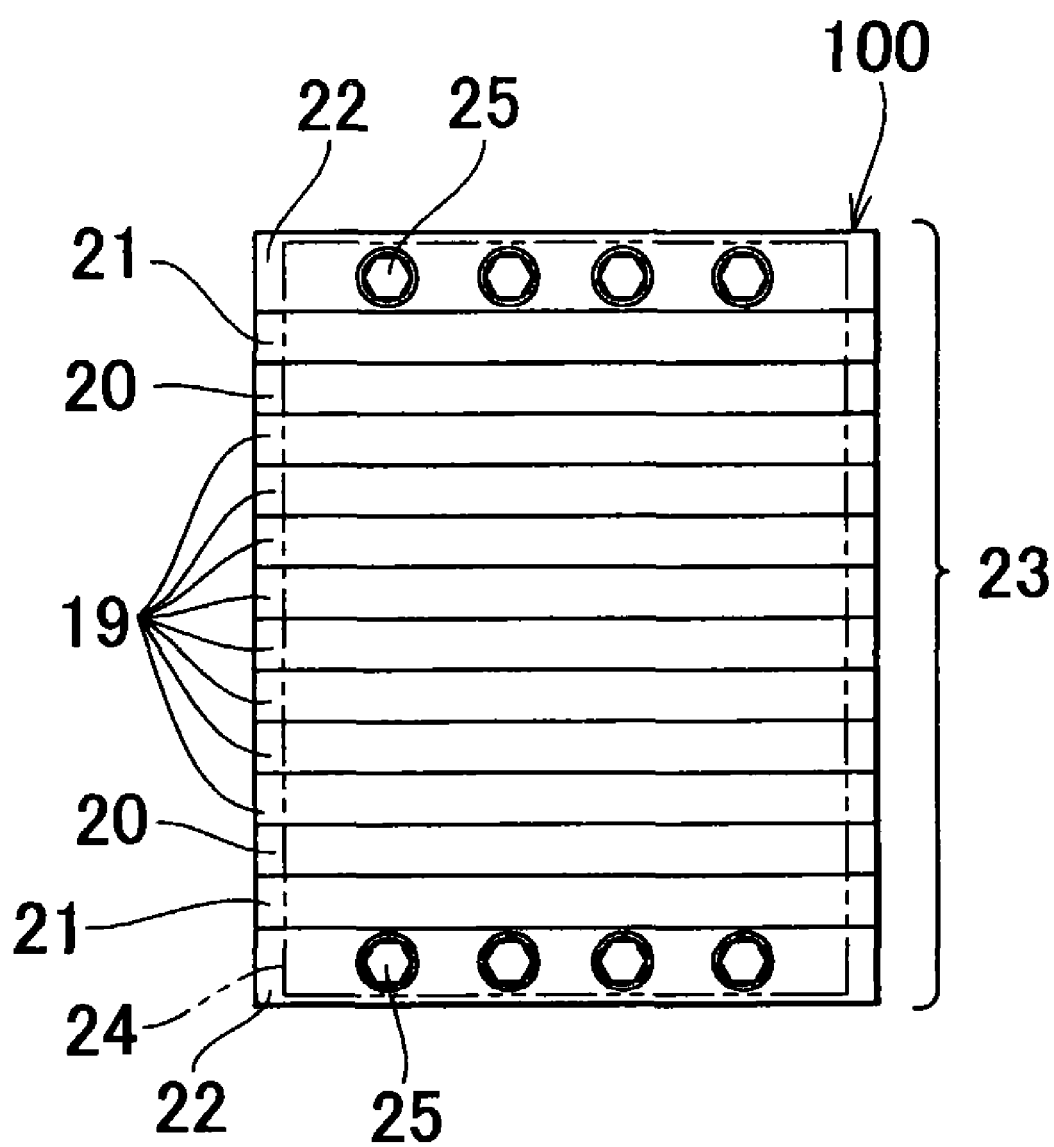
FIG. 11 is a side view showing a cell stacked body.
Figure 12:
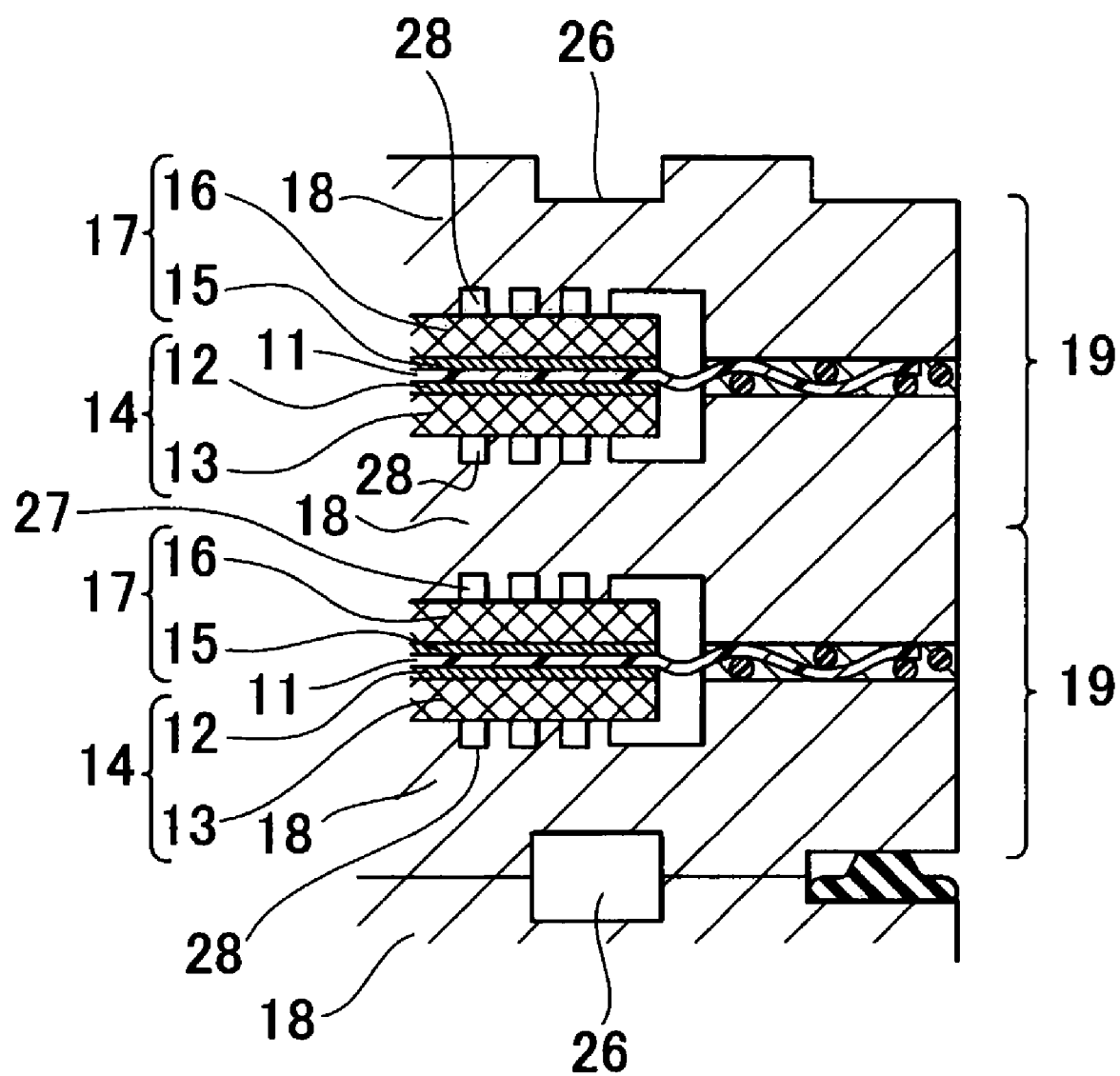
FIG. 12 is a sectional view showing part of the stack shown in FIG. 11.

As shown in FIGS. 11, 12, the solid polymer electrolyte membrane fuel cell 100 includes a plurality of Membrane-Electrode Assemblies (i.e., MEAs) and a plurality of separators 18. Each of the MEAs includes an electrolyte membrane 11 formed of an ion-exchange membrane, an electrode (i.e., an anode, a fuel electrode) 14 having a catalyst layer 12 which is provided on one surface of the electrolyte membrane 11, and an electrode (i.e., cathode, an air electrode) 17 having a catalyst layer 15 which is provided on the other surface of the electrolyte membrane 11. A diffusion layers 13 is provided between the catalyst layer 12 and the separator 18 on the anode side, and a diffusion layer 16 is provided between the catalyst layer 15 and the separator 18 on the cathode side.

A fuel gas passage 27 for supplying fuel gas (i.e., hydrogen) to the anode 14, and an oxidizing gas passage 28 for supplying oxidizing gas (i.e., oxygen, normally, air) to the cathode 17 are formed in the separator 18. A coolant passage 26 for supplying coolant (i.e., cooling water, normally) is also formed in the separator 18. Each of the passages 26, 27, 28 may be a serpentine passage which extends from an inlet to an outlet while winding at at least one portion, or may be a straight passage which extends straight from the inlet to the outlet.

A coolant manifold 29, a fuel gas manifold 30, and an oxidizing gas manifold 31 are formed in the separator 18. The coolant manifold 29 communicates with the coolant passage 26, the fuel gas manifold 30 communicates with the fuel gas passage 27, and the oxidizing gas manifold communicates with the oxidizing gas passage 28. The manifolds 29, 30, 31 are formed in opposite end portions of the rectangular separator 18. The passages 26, 27, 28 are formed in a center area which is an area of the separator other than an area in which the manifolds are formed. The area in which the gas passages 27, 28 are formed and the electrolyte membrane 11 exists is the area in which electric power is generated.

The separator 18 is formed by using one of carbon, metal, metal and resin (a metal separator and a resin frame), and resin to which conductivity is imparted, or is formed by using these materials in combination. The separator shown in the drawing is a carbon separator (i.e., a molded component made of carbon and a resin binder).

As shown in FIG. 11, a stack 23 is assembled in the following method. A cell 19 is formed by sandwiching the MEA between the separators 18. A module includes at least one cell (FIG. 12 shows an example in which two cells form one module). A cell stacked body is formed by stacking a plurality of modules. Terminals 20, insulators 21, and end plates 22 are provided at both ends of the cell stacked body in a cell stacked direction. The cell stacked body is fastened in the cell stacked direction. A fastening member (e.g., a tension plate 24), which is provided outside the cell stacked body and extends in the cell stacked direction, is fixed using screw bolts/nuts 25.

As shown in FIG. 12, in order to separate the passages 26, 27, 28 and the manifolds 29, 30, 31 (shown in FIGS. 1, 2, 3) from each other and from the outside (i.e., the atmosphere), an adhesive agent 32 (shown in FIG. 6) is provided between components (i.e., components including at least the separator 18 and the electrolyte membrane 11) of the fuel cell 100 in the vicinity of the passages 26, 27, 28 and in the vicinity of the manifolds 29, 30 31. The adhesive agent 32 bonds the components of the cell or the module while sealing a gap between the components. The adhesive agent 32 serves as a sealant as well. The two components between which the adhesive agent 32 is provided are the separator 18 and the separator 18, or the separator 18 and the electrolyte membrane 11.

Figure 1:
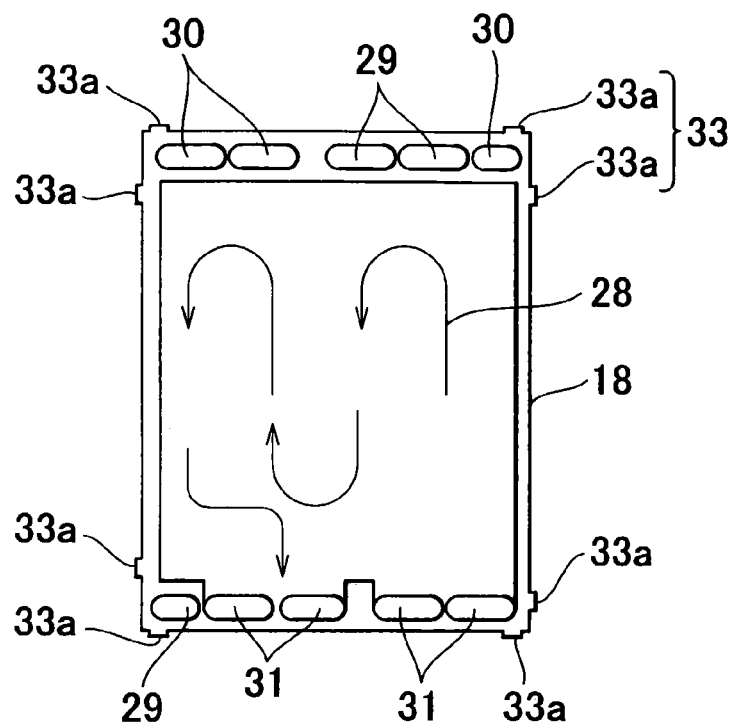
FIG. 1 is a plan view showing a cathode side separator in a stack structure of a fuel cell according to the invention.
Figure 2:
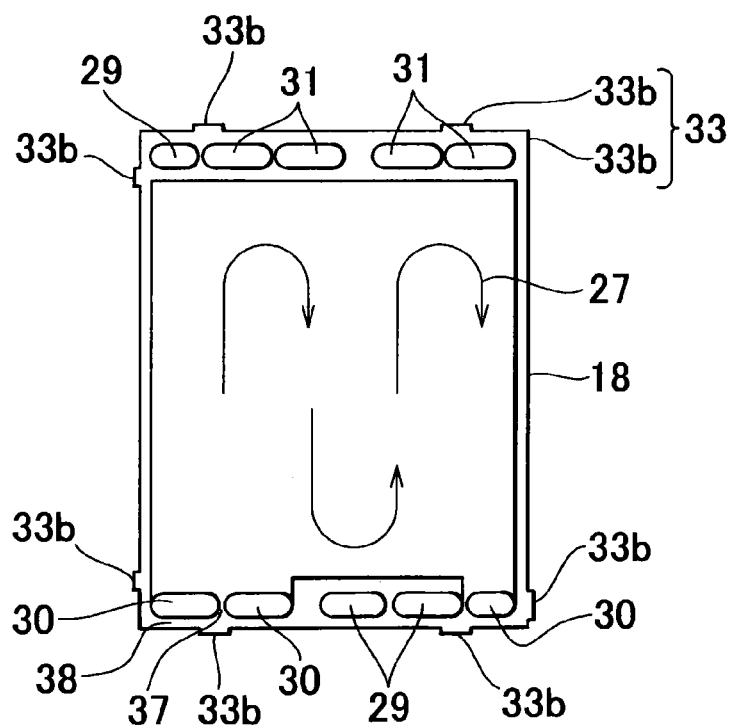
FIG. 2 is a plan view showing an anode side separator in the stack structure of a fuel cell according to the invention.
Figure 3:
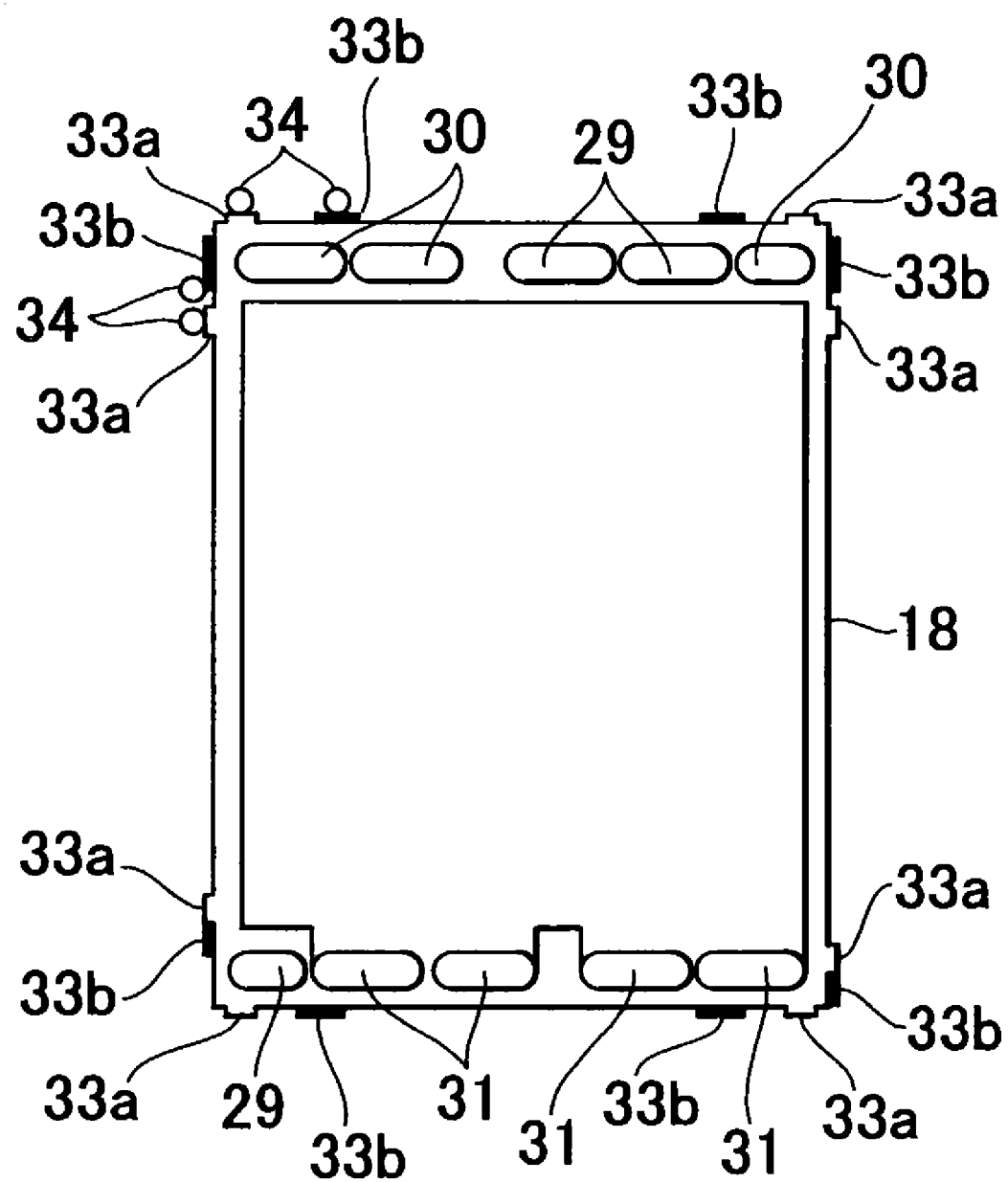
FIG. 3 is a plan view when the cathode side separator and the anode side separator overlap with each other in the stack structure of a fuel cell according to the invention.
Figure 7:
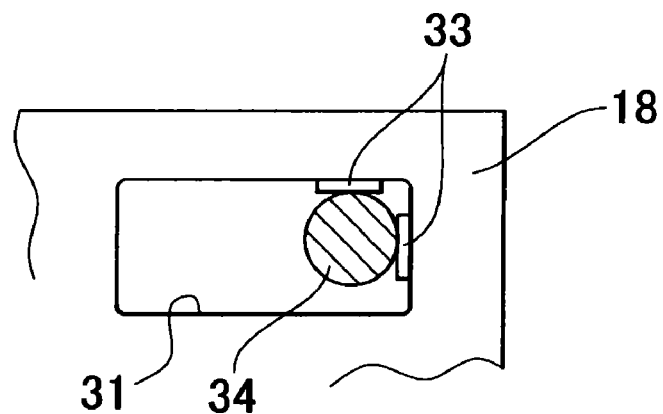
FIG. 7 is a plan view when a protruding portion is formed inside a manifold in the stack structure of a fuel cell according to the invention.

As shown in FIGS. 1 to 3, a plurality of protruding portions 33 each of which has a tip portion is formed on the end portions of the separators 18 of the fuel cell 100. The protruding portion 33 protrudes from the end portion in the direction perpendicular to the cell stacked direction. The tip portion contacts the reference portion of the assembly jig during assembly of the fuel cell. The end portion of the separator 18 may be the end portion facing the outside (i.e., the atmosphere) of the separator 18 as shown in FIGS. 1 to 3 (when a reference portion 34 is positioned outside the separator), or may be the end portion facing one of the manifolds 29, 30, 31 as shown in FIG. 7 (when the reference portion 34 is positioned inside the manifold). When the adhesive agent 32 is applied to the separator 18, the adhesive agent 32 is not applied to the surface of the protruding portion 33. The assembly jig may be the assembly jig for positioning the components when the components are assembled to a cell or a module, or may be the assembly jig for positioning the cells or the modules when stacking the cells or the modules so as to assemble a stack.

Figure 4:
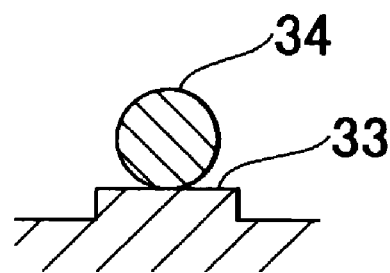
FIG. 4 is a sectional view showing an example of a protruding portion formed on the separator in the stack structure of a fuel cell according to the invention, and a reference portion of an assembly jig.
Figure 5:
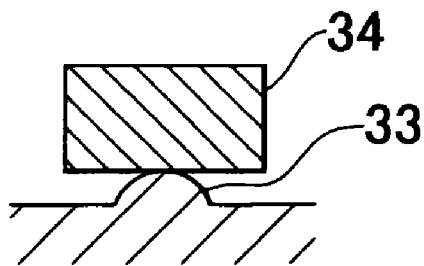
FIG. 5 is a sectional view showing another example of a protruding portion formed on a separator in the stack structure of a fuel cell according to the invention, and a reference portion of an assembly jig.
Figure 6:
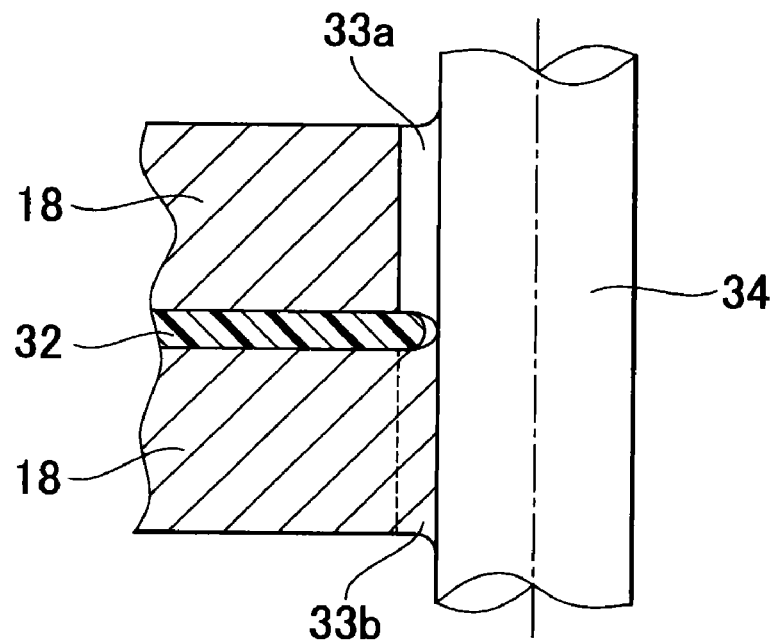
FIG. 6 is a side view showing the stack structure of a fuel cell shown in FIG. 4.

The protruding portion 33 has a height enough to prevent the adhesive agent 32 between the separators 18 from coming out from the tip portion of the protruding portion 33, when the adhesive agent 32 is pressed by the separators and spreads. The height of the protruding portion 33 with respect to the end portion having no protruding portion is approximately 0.5 mm. The height needs to be at least 0.2 mm, preferably, 0.3 mm or more. As shown in FIG. 4, when the reference portion 34 of the assembly jig contacting the protruding portion 33 has a convex curved surface, for example, when a cross section of the reference portion is substantially circular in the direction perpendicular to the cell stacked direction, it is preferable that the protruding portion 33 have a flat tip portion. As shown in FIG. 5, when the reference portion 34 of the assembly jig has a flat surface in parallel with the end portion of the separator, it is preferable that the protruding portion 33 contacting the reference portion 34 have a convex curved surface.

As shown in FIGS. 1 to 3, when the protruding portions 33 are formed on the end portions of the separators 18 so as to protrude from the end portions in the direction perpendicular to the cell stacked direction. The protruding portions 33 of the anode side separator 18 and the protruding portions 33 of the cathode side separator 18 are displaced from each other in a direction perpendicular to the cell stacked direction. Therefore, the protruding portions 33 of the anode side separator 18 and the protruding portions 33 of the cathode side separator 18 do not overlap with each other in the cell stacked direction. FIG. 1 shows the positions of the protruding portions 33a formed on the cathode side separator 18. FIG. 2 shows the positions of the protruding portions 33b formed on the anode side separator 18. FIG. 3 shows a relationship between the positions of the protruding portions 33b of the anode side separator 18 and the positions of the protruding portions 33a of the cathode side separator 18, when the cell is formed by sandwiching the MEA between the anode side separator 18 and the cathode side separator 18 such that the gas passage of each of the separators 18 is on the MEA side. As can be understood from FIG. 3, the protruding portions 33a and the protruding portions 33b are displaced from each other in the direction perpendicular to the cell stacked direction (i.e., the separator stacked direction). Therefore, the protruding portions 33a and the protruding portions 33b do not overlap with each other in the cell stacked direction.

The separator 18 has a rectangular shape (including a substantially rectangular shape) in a plan view, and the protruding portions 33 are formed in the vicinity of the corner portions of the rectangular separator 18. The protruding portion 33 may be formed on a portion of the separator 18 corresponding to a longitudinal side of one of the manifolds 29, 30, 31, so as to protrude in the direction perpendicular to the direction in which the longitudinal side extends. In such a case, a beam 37 is provided between the longitudinal side of the manifold (a first longitudinal side 35) and a second longitudinal side 36 which faces the first longitudinal side and extends in parallel with the first longitudinal side. By providing the beam 37, the rigidity of a narrow separator portion 38 between the first longitudinal side and the end portion of the separator is enhanced in the direction perpendicular to the cell stacked direction.

Figure 8:
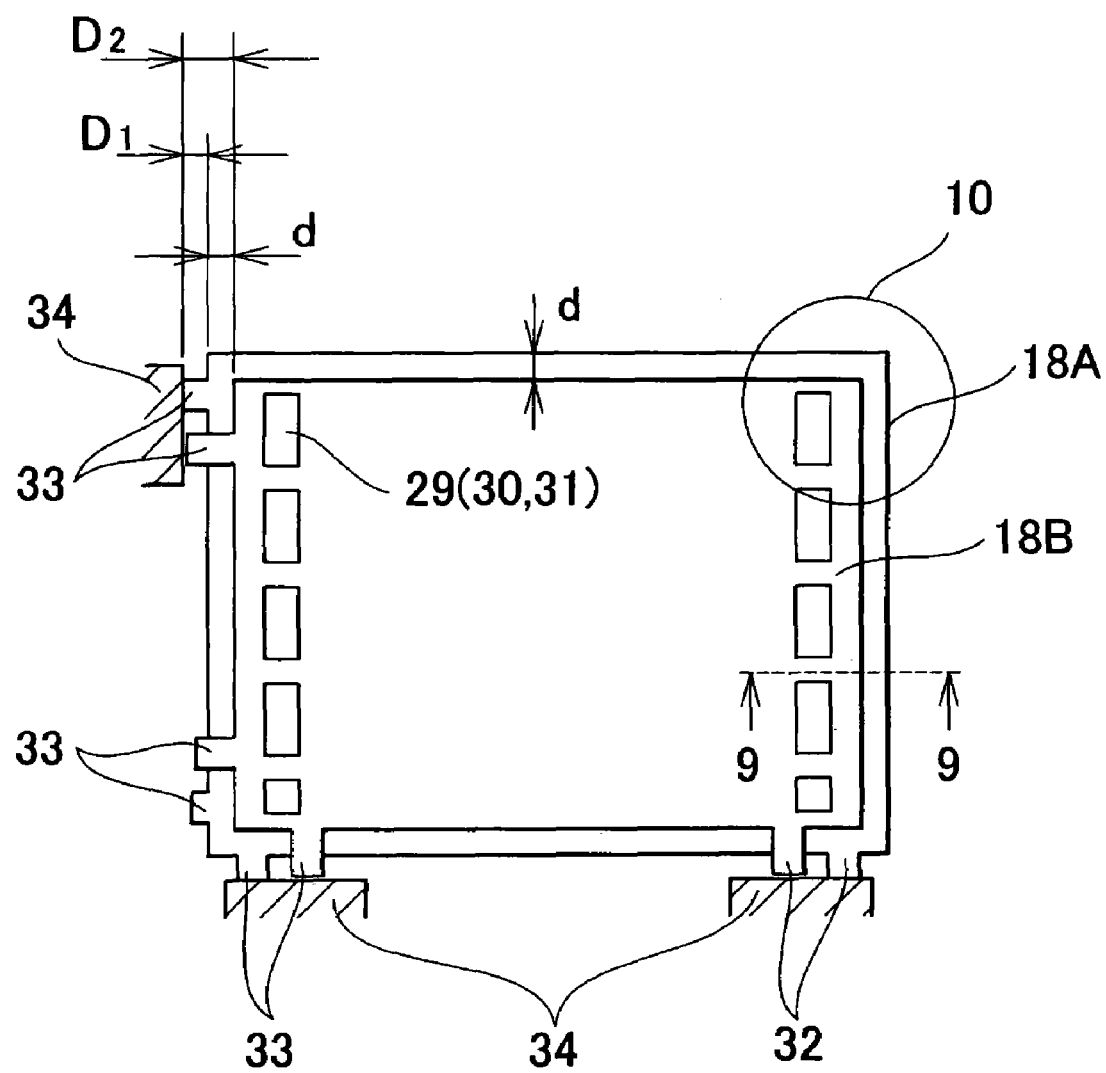
FIG. 8 is a plan view when the separators adjacent to each other are stacked in the stack structure of a fuel cell according to the invention.
Figure 9:
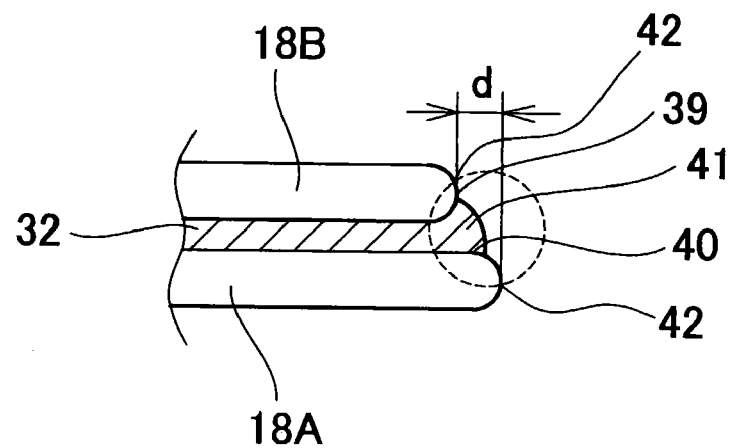
FIG. 9 is a sectional view taken along line in FIG. 8.

FIGS. 8 and 9 show another embodiment of the invention. In the structure shown in FIGS. 8 and 9, the separators 18 adjacent to each other have different circumferences. Accordingly, one of the separators 18 adjacent to each other is slightly smaller than the other separator 18. The separators 18 adjacent to each other may be the two separators 18 which are adjacent to each other with the electrolyte membrane therebetween 11, or may be the anode side separator and the cathode side separator which are adjacent to each other. In an example shown in FIG. 8, the circumference is the circumference of an outer edge portion of the separator.

Seen from the cell stacked direction, compared with the outer edge portion of the separator 18 having a shorter circumference, the outer edge portion of the separator 18 having a longer circumference protrudes further in an outward direction and in a direction perpendicular to the outer edge portion of the separator having a shorter circumference in the direction perpendicular to the cell stacked direction. The amount of protrusion is shown by a reference symbol d in FIG. 8. The entire outer edge portion of the separator 18A having a longer circumference protrudes with respect to the entire outer edge portion of the separator 18B having a shorter circumference. Accordingly, as shown in FIG. 9, an adhesive agent holding portion 41 is formed outside an end surface 39 of the end edge portion of the separator 18B having a shorter circumference. The adhesive agent holding portion 41 is formed by the end surface 39 (a surface extending in the cell stacked direction) of the outer edge portion of the separator 18 having a longer circumference, and a separator surface 40 (a surface perpendicular to the cell stacked direction) of the outer edge of the separator 18A having a shorter circumference.

The position of the tip portion of the protruding portion 33 formed on the separator 18A having a shorter circumference in the direction perpendicular to the cell stacked direction, and the position of the tip portion of the protruding portion 33 formed on the separator 18B having a longer circumference in the cell stacked direction are the same. Also, the position of the tip portions is outside the outer edge portion of the separator 18 having a longer circumference. Accordingly, a height $D_2$ of he protruding portion 33 formed on the separator 18B having a shorter circumference is larger than a height $D_1$ of the protruding portion 33 formed on the separator 18A having a longer circumference. The relationship between $D_2$ and $D_1$ is expressed by an equation $D_2=d+D_1$.

Figure 10:
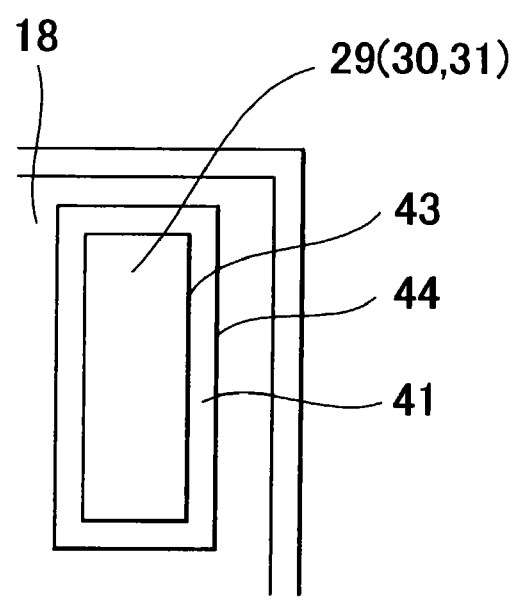
FIG. 10 is an enlarged plan view of a manifold portion and a vicinity thereof in FIG. 8.

FIG. 8 shows a case in which the circumference is the circumference of the outer edge portion of the separator. However, as shown in FIG. 10, the circumference may be a circumference of one of the manifolds (i.e., the coolant manifold 29, the fuel gas manifold 30, and the oxidizing gas manifold 31). In this case, compared with a separator edge 44 having a longer manifold circumference, a separator edge 43 having a shorter manifold circumference protrudes more in an inward direction of the manifold. An adhesive agent holding portion 41 is formed by a separator surface of the edge 43 and end surface of the edge 44. FIG. 9 is applied to an example shown in FIG. 10. However, the adhesive agent holding portion 41 is formed on the periphery of the manifold.

In the example shown in FIGS. 8 and 10, as shown in FIG. 9, a convex curved surface 42 or a chamfer may be formed on the end surface (the surface extending in the cell stacked direction) of the outer edge portion of the separator 18. When the curved surface 42 or the chamfer is formed, an area of a cross section of the adhesive agent holding portion 41 is larger than when the curved surface or the chamfer is not formed.

Hereafter, effect of the invention will be described. When assembling a cell, a module, or a stack, the separator 18 contacts the reference portion 34 of the assembly jig at the protruding portion 33. The adhesive agent does not come out from the tip portion of the protruding portion. Therefore, unlike the conventional case, the problem does not occur in which the adhesive agent, which has come out from the end portion of the separator, adheres to the reference portion of the assembly jig and thus the positioning accuracy in stacking the cells is reduced.

The protruding portions 33b of the anode side separator 18 and the protruding portions 33a of the cathode side separator 18, the separators being adjacent to each other with the MEA therebetween, are displaced from each other in the direction perpendicular to the cell stacked direction. Accordingly, even when the protruding portions 33 are deformed in the cell stacked direction by receiving a reaction force when the protruding portions 33 are pressed to the reference portion 34, the protruding portions 33a do not contact the protruding portions 33b. Therefore, it is possible to prevent a short-circuit from occurring. The occurrence of the short-circuit is due to the deformation of the separators 18 caused by making the separators 18 contact the reference portion 34 of the assembly jig.

Also, since the beam 37 is provided on one of the manifolds 26, 27, 28, which is positioned in the vicinity of the protruding portion 33, the separator portion 38 between the manifold and the end portion on which the protruding portion is formed can be reinforced, and the separator portion 38 can be prevented from being deformed by receiving a reaction force when the protruding portion 33 is pressed to the reference portion 34. As a result, positioning can be performed with high accuracy. Also, even when the protruding portion 33 is strongly pressed to the reference portion 34, the separator portion 38 between the manifold and the end portion on which the protruding portion 33 is formed is not damaged. Accordingly, reliability for the rigidity of the separator is enhanced.

As shown in FIGS. 8, 9, 10, when the sizes of the separators 18 adjacent to each other are made different by making the circumferences of the separators 18 adjacent to each other different, the adhesive agent holding portion 41 is formed outside the end surface 39 of the smaller sized separator 18B (in the case in which the protruding portion is formed in the manifold, the adhesive agent holding portion is formed inside the end surface of the end edge 44) by the end surface 39 of the smaller sized separator 18B (the surface extending in the cell stacked direction, in the case where the protruding portion is formed in the manifold, the end surface of the end edge 44) and the separator surface 40 of the larger sized separator 18A (the surface perpendicular to the cell stacked direction, in the case where the protruding portion is formed in the manifold, the separator surface of the end edge 43). Accordingly, even when the adhesive agent 18 between the separators comes out by being pressed by the separators 18, the adhesive agent only comes out to the adhesive agent holding portion 41, and does not come out from the large sized separator 18A which is outside the adhesive agent holding portion 41 (in the case in which the protruding portion is formed in the manifold, inside the end surface of the end edge 43). Therefore, the adhesive agent 32 does not come out to the tip portion of the protruding portion 33. Accordingly, the conventional problem is prevented from occurring in which the adhesive agent comes out from the end portion of the separator, and the positioning accuracy of the cell stacking is reduced due to the adhesion of the adhesive agent, which has come out from the end portion of the separator, to the reference portion of the assembly jig.

When the curved surface 42 or the chamfer is formed on the end surface of the outer edge portion of the separator 18 or the end surface of the manifold, as shown in FIG. 9, the area of the cross section of the adhesive agent holding portion is large. Accordingly, the ability of the adhesive agent holding portion 41 to absorb the adhesive agent, which has come out from the gap between the separators, is enhanced, which further prevents the positioning accuracy of the cell staking from being reduced.

What is claimed is:

1. A stack structure of a fuel cell, comprising:
   a plurality of separators of a fuel cell;
   a protruding portion which is formed on an end portion of each of the separators, and the protruding portion has a tip portion that is to contact a reference portion of an assembly jig, without contacting a surface on which the protruding portion is formed, during assembly of the fuel cell; and
   a plurality of cells each of which comprises the separators and an Membrane-Electrode Assembly, wherein the protruding portion protrudes in a direction perpendicular to a cell stacked direction;
   wherein the protruding portions of the separators adjacent to each other are formed so as to be displaced with respect to each other in the cell stacked direction and offset from one another in the direction perpendicular to the cell stacked direction.

2. The stack structure according to claim 1, further comprising:
   a plurality of sealants each of which is provided between the separator and the separator, or between the separator and the Membrane-Electrode Assembly when the cells are stacked, wherein the protruding portion has a predetermined height such that the sealant does not come out from the tip portion.

3. The stack structure according to claim 2, wherein the predetermined height of the protruding portion is 0.3 mm or more.

4. The stack structure according to claim 1, wherein the protruding portions of the separators adjacent to each other are formed so as not to overlap with each other in a cell stacked direction.

5. The stack structure according to claim 1, wherein each of the separators has a rectangular shape, and the protruding portion is formed in a vicinity of a corner portion of the separator.

6. The stack structure according to claim 1, wherein a plurality of the protruding portions is formed on each of the separators.

7. The stack structure according to claim 1, wherein a cross section of the protruding portion is substantially circular in a direction perpendicular to a cell stacked direction.

8. The stack structure according to claim 1, wherein a cross section of the protruding portion is substantially rectangular in a direction perpendicular to a cell stacked direction.

9. The stack structure according to claim 1, wherein the protruding portion protrudes toward an outside of the separator.

10. The stack structure according to claim 1, wherein the protruding portion protrudes toward an inside of the separator.

11. The stack structure according to claim 1, further comprising:
   a gas passage formed in each of the separators and extends in the cell stacked direction, wherein the protruding portion is formed on a wall surface of the gas passage.

12. The stack structure according to claim 1, wherein circumferences of the separators adjacent to each other are different.

13. The stack structure according to claim 12, wherein a curved surface or a chamfer is formed on an end surface of each of the separators.

14. The stack structure according to claim 1, wherein the end portions of the separators adjacent to each other form a step portion.

* * * * *